US008300133B2

(12) United States Patent
Miyanishi

(10) Patent No.: US 8,300,133 B2
(45) Date of Patent: Oct. 30, 2012

(54) IMAGING APPARATUS

(75) Inventor: Mikio Miyanishi, Osaka (JP)

(73) Assignee: Sony Corporation (JP)

(*) Notice: Subject to any disclaimer, the term of this patent is extended or adjusted under 35 U.S.C. 154(b) by 379 days.

(21) Appl. No.: 12/592,434

(22) Filed: Nov. 24, 2009

(65) Prior Publication Data

US 2010/0134676 A1 Jun. 3, 2010

(30) Foreign Application Priority Data

Dec. 3, 2008 (JP) ................................ P2008-308370

(51) Int. Cl.
*H04N 5/222* (2006.01)
*G06F 3/041* (2006.01)

(52) U.S. Cl. .................................... 348/333.01; 345/173

(58) Field of Classification Search ............. 348/333.01, 348/333.02, 333.05, 333.11; 345/173
See application file for complete search history.

(56) References Cited

U.S. PATENT DOCUMENTS

| | | | | |
|---|---|---|---|---|
| 5,521,638 | A * | 5/1996 | Dezaki et al. | 348/208.16 |
| 6,091,450 | A * | 7/2000 | Hirasawa | 348/333.01 |
| 6,611,285 | B1 * | 8/2003 | Morita | 348/211.3 |
| 2005/0052553 | A1 * | 3/2005 | Kido et al. | 348/296 |
| 2007/0024736 | A1 * | 2/2007 | Matsuda et al. | 348/333.12 |
| 2008/0267607 | A1 * | 10/2008 | Mori | 396/374 |

FOREIGN PATENT DOCUMENTS

JP 2001-059984 A 3/2001

* cited by examiner

*Primary Examiner* — Trung Diep

(74) *Attorney, Agent, or Firm* — Lerner, David, Littenberg, Krumholz & Mentlik, LLP

(57) ABSTRACT

An imaging apparatus includes: an ocular-type finder; a display section provided below the finder and having a display screen capable of displaying an image; processing means for detecting where a finger touches the display screen and carrying out a process according to the touched position; and a grip serving for gripping purposes provided to the right of the display section, wherein an angled area formed of a right end area and a lower end area is defined in the right half of the display screen, and the processing means includes limited processing means for carrying out a process associated with a touching operation detected only in the angled area when an eye has approached the finder.

14 Claims, 12 Drawing Sheets

IMAGING APPARATUS

CROSS-REFERENCE TO RELATED APPLICATION

The present application claims priority from Japanese Patent Application No. JP 2008-308370 filed in the Japanese Patent Office on Dec. 3, 2008, the entire content of which is incorporated herein by reference.

BACKGROUND OF THE INVENTION

1. Field of the Invention

The present invention relates to an imaging apparatus that detects where a finger touches a display screen and carries out a process according to the touched position.

2. Description of the Related Art

Some imaging apparatus (information processing apparatus), such as digital cameras, are known to have a monitor with a touch panel (touched position detector) as input means operated by a user. A touch panel of this type can display relatively large operation buttons and other objects on the monitor, and allows the user to carry out an input operation simply through a light touch action with a fingertip, whereby excellent operability is achieved.

Providing a touch panel in a rear monitor of an imaging apparatus, however, may cause a problem. For example, when the user looks into an optical finder, the nose or any other part of the user may touch the touch panel, resulting in an input operation that the user does not intend.

To solve the problem, JP-A-2001-59984, for example, discloses an imaging apparatus including an approaching eye sensor that senses that an eye of the user has approached the optical finder. When the approaching eye sensor senses that an eye of the user has approached, an input operation to the touch panel is disabled to prevent an unintended input.

SUMMARY OF THE INVENTION

However, the imaging apparatus disclosed in JP-A-2001-59984 inhibits any input to the touch panel when an eye of the user has approached the optical finder, which does not allow effective use of the touch panel. For example, the touch panel may be effectively used by allowing a finger slipped into a gap between the face of the user and the touch panel to carry out a touching operation when an eye of the user has approached the optical finder.

Thus, it is desirable to provide an imaging apparatus capable of effectively using a touched position detector when an eye of the user has approached a finder.

A first embodiment of the invention is directed to an imaging apparatus including an ocular-type finder, a display section provided below the finder and having a display screen capable of displaying an image, processing means for detecting where a finger touches the display screen and carrying out a process according to the touched position, and a grip serving for gripping purposes provided to the right of the display section. An angled area formed of a right end area and a lower end area is defined in the right half of the display screen, and the processing means includes limited processing means for carrying out a process associated with a touching operation detected only in the angled area when an eye has approached the finder.

A second embodiment of the invention is directed to an imaging apparatus including an ocular-type finder, a display section provided below the finder and having a display screen capable of displaying an image, and processing means for detecting where a finger touches the display screen and carrying out a process according to the touched position. The processing means includes limited processing means for carrying out a process associated with a touching operation detected only in the area of the display screen where the face does not prevent a touching operation performed by the finger when an eye has approached the finder.

According to the embodiments of the invention, an angled area formed of a right end area and a lower end area is defined in the right half of a display screen of a display section provided below a finder, and a process associated with a touching operation detected only in the angled area is carried out when an eye has approached the finder. As a result, the touched position detector can be effectively used when an eye has approached the finder.

According to the embodiments of the invention, a display section including a display screen is provided below a finder, and a process associated with a touching operation detected only in the area of the display screen where the face does not prevent a touching operation performed by a finger when an eye has approached the finder. As a result, the touched position detector can be effectively used when an eye has approached the finder.

DESCRIPTION OF THE PREFERRED EMBODIMENTS

Embodiment

[Configuration of Key Portion of Imaging Apparatus]

Figure 1:
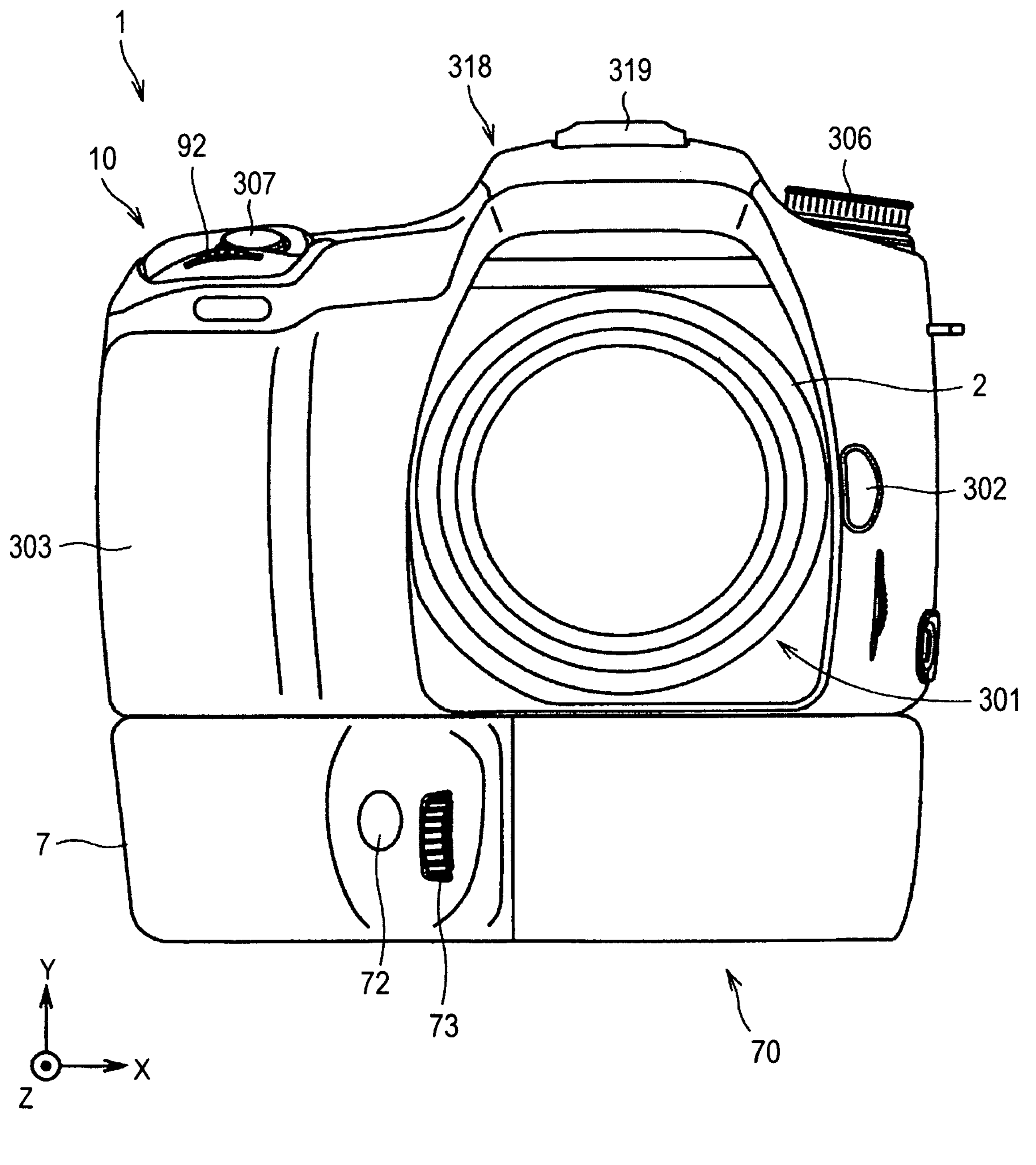
FIG. 1 shows the external configuration of an imaging apparatus 1 according to an embodiment of the invention.
Figure 2:
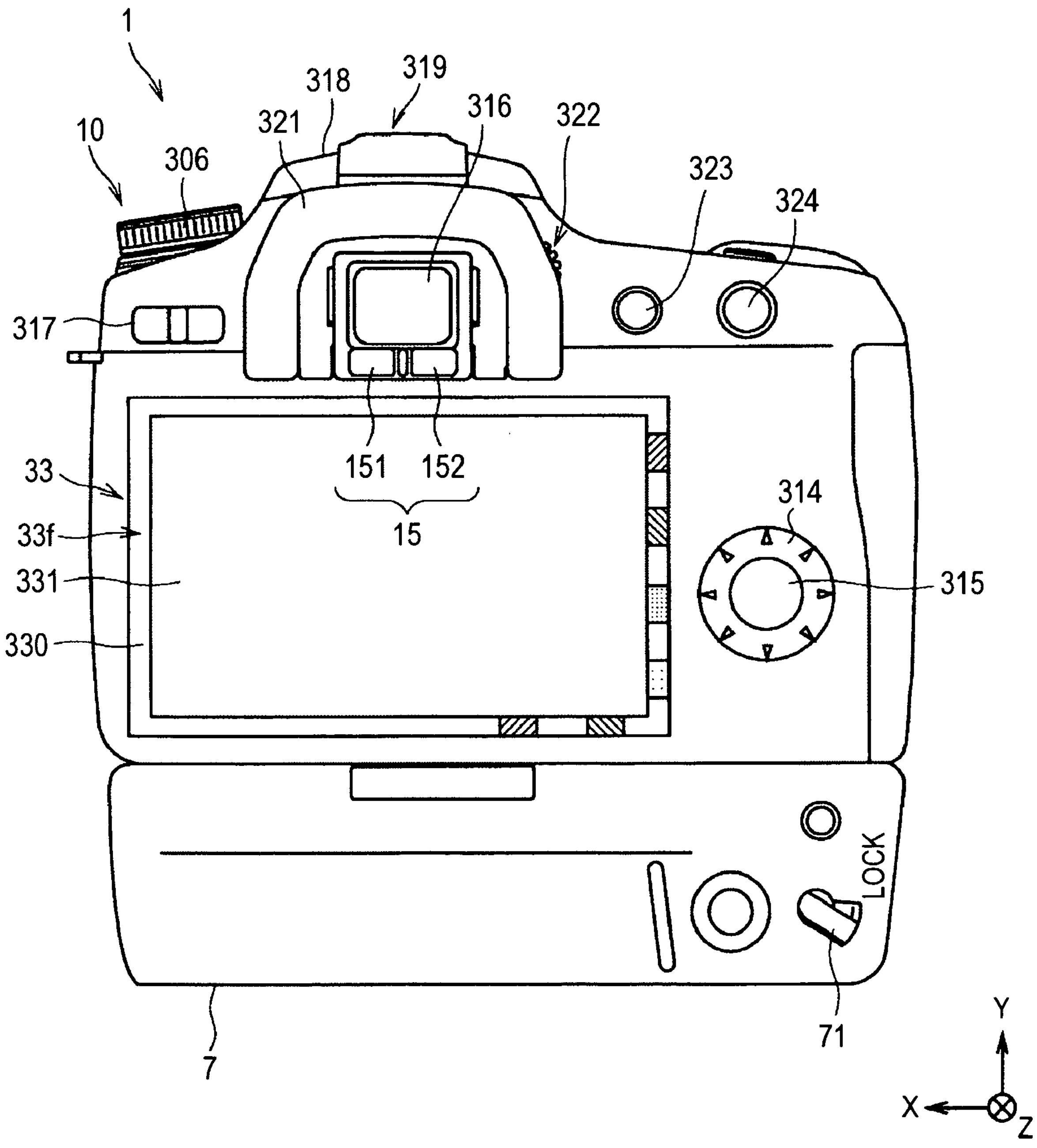
FIG. 2 shows the external configuration of the imaging apparatus 1.
Figure 3:
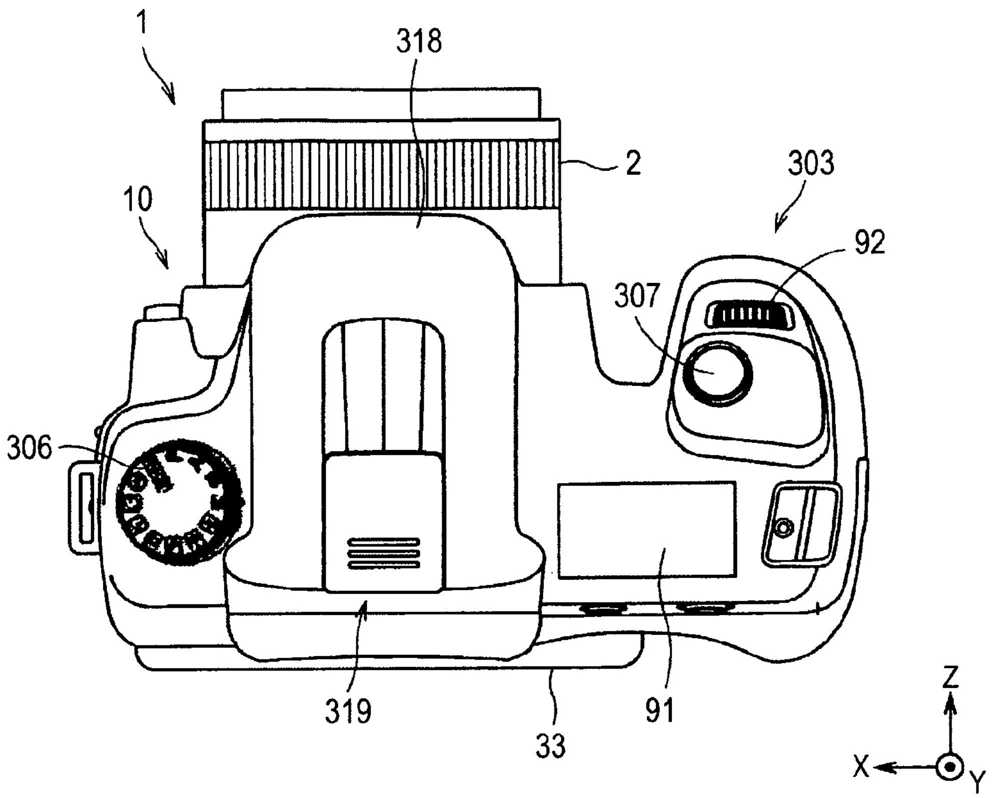
FIG. 3 shows the external configuration of the imaging apparatus 1.

FIGS. 1 to 3 show the exterior configuration of an imaging apparatus 1 according to an embodiment of the invention. FIGS. 1 and 2 are a front exterior view and a rear exterior view of the imaging apparatus 1 to which a vertical position control grip 7 is attached, and FIG. 3 is a top exterior view of the imaging apparatus 1. The imaging apparatus 1 is configured, for example, as a single-lens reflex digital still camera and includes a camera body 10 and an interchangeable lens 2 as an imaging lens that can be attached and detached to and from the camera body 10.

FIG. 1 shows the following components provided on the front side of the camera body 10: a mount 301 that is disposed in a substantially central portion of the front side and to which the interchangeable lens 2 is attached, a lens interchanging button 302 disposed to the right of the mount 301, a grip 303 gripped by a user, a mode setting dial 306 disposed in an upper right portion when viewed from the front, and a shutter button 307 and an operation dial 92 disposed on the upper side of the grip 303.

FIG. 2 shows the following components provided on the rear side of the camera body 10: a rear monitor 33, a cross-shaped key 314 disposed to the right of the rear monitor 33, a push button 315 disposed at the center of the cross-shaped key 314, an optical finder 316 disposed above the rear monitor 33, an eye cup 321 that surrounds the optical finder 316, a main switch 317 disposed to the left of the optical finder 316, an exposure correction button 323 and a monitor operation button 324 disposed to the right of the optical finder 316, and a flashlight 318 and a connection terminal 319 disposed above the optical finder 316.

The mount 301 has a connector Ec (see FIG. 5) for electrically connecting the mount 301 to the attached interchangeable lens 2 and a coupler 75 (see FIG. 5) for mechanically connecting.

The lens interchanging button 302 is pressed down to remove the interchangeable lens 2 attached to the mount 301.

The grip 303 is where the user grips the imaging apparatus 1 during imaging and provided to the right of the rear monitor 33. The surface of the grip 303 is corrugated to match the shape of fingers so that the fingers fit with the grip 303 more comfortably. The grip 303 has a battery compartment and a card compartment (not shown) provided therein. The battery compartment houses a battery 69B (see FIG. 5) as a power source of the camera, and the card compartment detachably houses a memory card 67 (see FIG. 5) for recording image data on captured images. The grip 303 may include a grip sensor for detecting whether or not the user grips the grip 303.

The mode setting dial 306 is provided to select any one of the following modes: an auto-exposure (AE) control mode, a manual exposure (M) control mode, and a variety of imaging modes according to imaging scenes.

The shutter button 307 is a press-down switch that allows two operation states, a "half-pressed state" in which the shutter button 307 is pressed halfway and a "fully-pressed state" in which the shutter button 307 is further pressed. When the shutter button 307 is pressed halfway, preparation actions for imaging a subject (preparation actions, such as setting an exposure control value and adjusting the focus) are carried out. When the shutter button 307 is fully pressed, imaging actions (a series of actions including exposing an imaging device 101 (see FIG. 5) to light, performing predetermined image processing on an image signal obtained by the exposure action, and recording the resultant image signal in the memory card or any other suitable component) are carried out.

The operation dial 92 is a rotary operation member and can change a variety of settings in accordance with the rotation of the operation dial 92. That is, control values in the variety of imaging modes can be set by operating the operation dial 92.

The rear monitor 33 is provided below the optical finder 316 and includes an LCD (Liquid Crystal Display) 331 that works as a display screen 33*f* capable of displaying a color image. The rear monitor 33 not only displays an image captured by the imaging device 101 (see FIG. 5) when a final image has been captured and reproduces and displays a recorded image, but also displays a setting screen for setting the functions and modes provided in the imaging apparatus 1. When a mirror unit 103 (see FIG. 5) is in a mirror-up state, the rear monitor 33 can display images of a subject successively captured by the imaging device 101 (FIG. 5) as live-view images (preview images) before a final image is captured. A frame 330 having an open square shape is provided around the rear monitor 33.

The cross-shaped key 314 has an annular member including a plurality of pressing portions disposed at equal spacings in the circumferential direction (the portions indicated by the triangular marks in FIG. 2), and contacts (switches) (not shown) provided in correspondence with the pressing portions detect pressing operations performed on the respective pressing portions. The push button 315 is disposed at the center of the cross-shaped key 314. The cross-shaped key 314 and the push button 315 are provided to input instructions, such as autofocusing, changing a focus detection position in the upward, downward, rightward, leftward, and diagonal directions, advancing frames of recorded images to be reproduced on the rear monitor 33 or any other monitor, and setting imaging conditions (such as the ISO sensitivity, WB, and flashlight activation).

Figure 4:
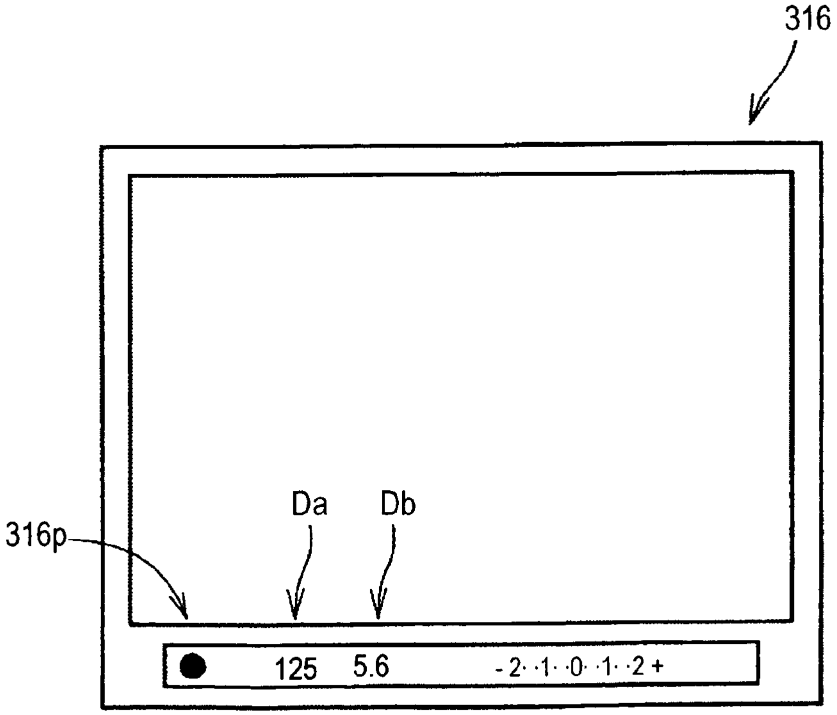
FIG. 4 is a diagram for describing an information display section 316*p* in an optical finder 316.

The optical finder 316 is an ocular-type finder provided on the rear side of the camera body 10 and optically displays a subject in the imageable range. That is, the optical finder 316 displays a subject image introduced through the interchangeable lens 2, and the user visually recognizes the subject image, whereby the user can see the subject to be actually imaged by the imaging device 101. An in-finder information display section (hereinafter also abbreviated to an "information display section") 316*p* is provided in a lower portion of the optical finder 316. The information display section 316*p* uses a liquid crystal display panel (not shown) disposed in the imaging apparatus 1 to display a shutter speed indication Da, an aperture setting indication Db, and other imaging-related information, as shown in FIG. 4, for example, when the shutter button 307 is pressed halfway.

An approaching eye sensor 15 including a light emitting device 151 that emits infrared light and a light receiving device 152 is disposed immediately below the optical finder 316. The approaching eye sensor 15 senses that an eye of the user has approached the optical finder 316 (approaching eye sensing) in the following manner: The infrared light emitted from the light emitting device 151 formed of, for example, an LED is reflected off an eye of the user, and the light receiving device 152 detects the reflected light.

In FIG. 2, the main switch 317 is formed of a two-contact slidable switch that slides sideways. When the main switch 317 is set at the right position, the imaging apparatus 1 is powered on, whereas when the main switch 317 is set at the left position, the imaging apparatus 1 is powered off.

The flashlight 318 is configured as a popup-type, built-in flashlight. Alternatively, an external flashlight or any other component is attached to the camera body 10 by using the connection terminal 319.

The eye cup 321 is a U-shaped, light-blocking member that prevents external light from entering the optical finder 316.

The exposure correction button 323 is used to manually adjust the exposure setting (aperture setting and shutter speed). The monitor operation button 324 is used to not only manually switch the display format in the rear monitor 33 (such as detailed display and enlarged display) but also light up and shut off the rear monitor 33. That is, the monitor operation button 324 can choose a light-up state (displayed state) or a shut-off state (non-displayed state) of the display screen 33*f* of the rear monitor 33.

An upper-side display panel 91 is provided on the upper side of the camera body 10, as shown in FIG. 3. The upper-side display panel 91 works as another display section different from the rear monitor 33 and displays the current values in a variety of settings.

The interchangeable lens 2 functions as not only a lens window through which the light from a subject (optical image) is introduced but also an imaging optical system for guiding the subject light to the imaging device 101 disposed in the camera body 10. The interchangeable lens 2 can be detached from the camera body 10 by pressing down the lens interchanging button 302 described above.

Figure 5:
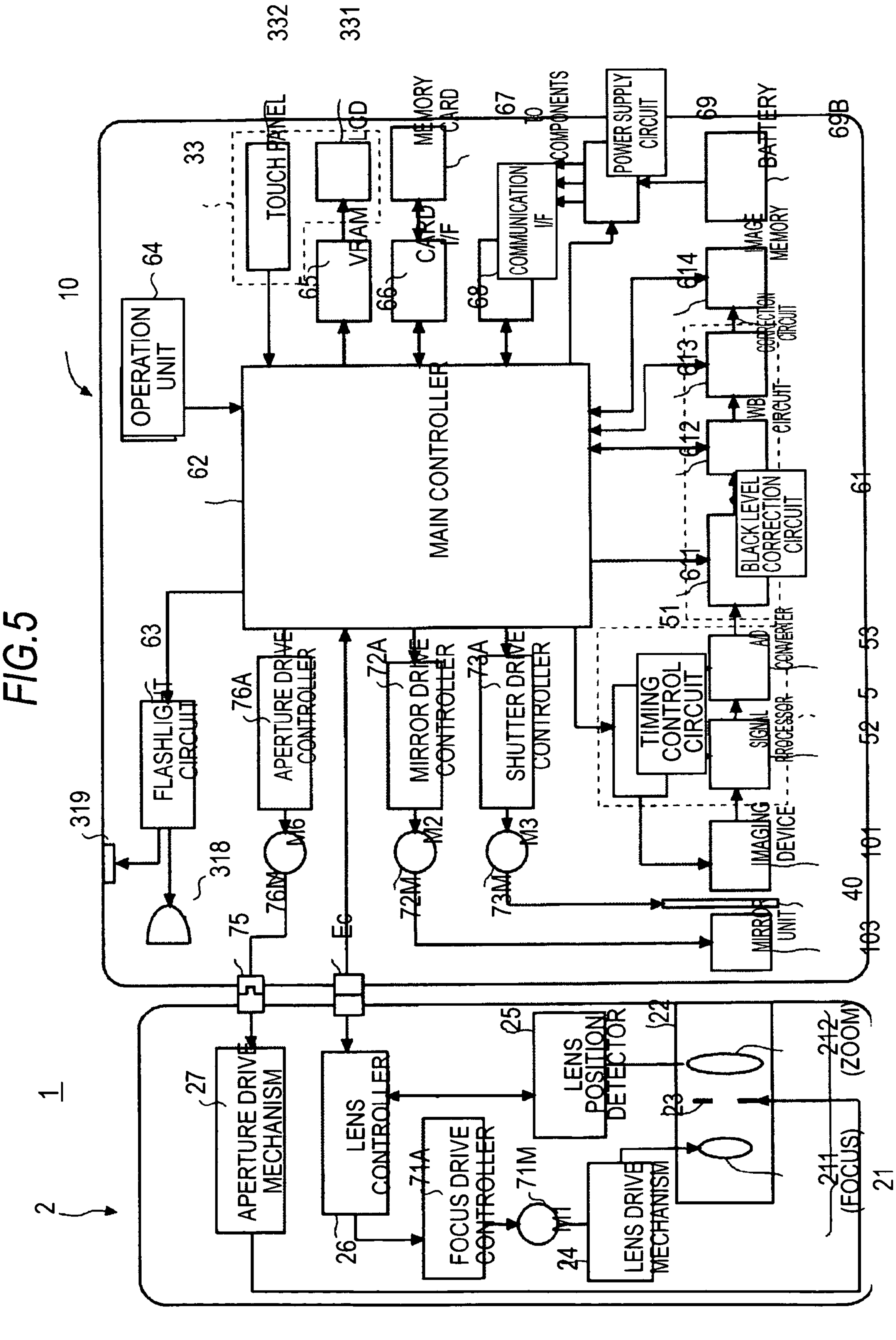
FIG. 5 is a block diagram showing the electrical configuration of the imaging apparatus 1.

The interchangeable lens 2 includes a lens group 21 formed of a plurality of lenses disposed in series along the optical axis of the interchangeable lens 2 (see FIG. 5). The lens group 21 includes a focus lens 211 (see FIG. 5) for adjusting the focus and a zoom lens 212 (see FIG. 5) for changing the magnification. Moving the focus lens 211 and the zoom lens 212 along the optical axis of the interchangeable lens 2 allows the magnification to be changed and the focus to be adjusted, respectively. The interchangeable lens 2 further includes an operation ring provided in an appropriate outer circumferential portion of a lens barrel of the interchangeable lens 2, and the operation ring is rotatable along the outer circumferential surface of the lens barrel. The zoom lens 212 moves in the optical axis direction in accordance with the direction and amount of manual or automatic rotation of the operation ring to set a zoom magnification (imaging magnification) according to the position to which the zoom lens has moved.

The vertical position control grip 7 includes a grip 70 and a lock switch 71, and the user grips the grip 70 when the imaging apparatus 1 is used in a vertical position (vertical attitude).

A shutter button 72 and an operation dial 73 are provided in the vicinity of the grip 70. The shutter button 72 has the same configuration as that of the shutter button 307, and the operation dial 73 has the same configuration as that of the operation dial 92. When the imaging apparatus 1 is used in the vertical attitude, the shutter button 72 can be used to input, for example, an imaging start instruction with the same operating sensation as that provided when the shutter button 307 is used.

The lock switch 71 is formed of a lever-type switch. When the lever of the lock switch 71 is inclined leftward or rightward, operations performed through the vertical position control grip 7 are enabled or disabled.

[Electrical Configuration of Imaging Apparatus 1]

FIG. 5 is a block diagram showing the electrical configuration of the imaging apparatus 1. The members and other components that are the same as those in FIGS. 1 to 3 have the same reference characters. The interchangeable lens 2 is classified into the following two types: a lens with an autofocus driver built therein and a lens that perform autofocusing under the control of the camera body. It is assumed in the following description that the interchangeable lens 2 is the former type for ease of description. The electrical configuration of the interchangeable lens 2 will first be described.

The interchangeable lens 2 includes not only the lens group 21 described above, which forms the imaging optical system, but also a lens drive mechanism 24, a lens position detector 25, a lens controller 26, and an aperture drive mechanism 27.

The lens group 21 includes the focus lens 211, the zoom lens 212, and an aperture 23 for adjusting the amount of light incident on the imaging device 101 disposed in the camera body 10. The focus lens 211, the zoom lens 212, and the aperture 23 are held in the lens barrel along the optical axis of the interchangeable lens 2, capture an optical image of a subject, and focus it on the imaging device 101. In AF control, an AF actuator 71M in the interchangeable lens 2 moves the focus lens 211 along the optical axis for focus adjustment.

A focus drive controller 71A produces a drive control signal, which is necessary to move the focus lens 211 to a focused position and sent to the AF actuator 71M, based on an AF control signal provided from a main controller 62 via the lens controller 26. The AF actuator 71M is formed of a stepper motor or any other suitable component and provides a lens driving force to the lens drive mechanism 24.

The lens drive mechanism 24 is formed of, for example, a helicoid and a gear or any other suitable component (not shown) that rotates the helicoid, receives the driving force from the AF actuator 71M, and moves the focus lens 211 and other components in the direction parallel to the optical axis. The direction in which the focus lens 211 is moved and the amount of movement thereof are determined by the rotating direction and the number of rotation of the AF actuator 71M, respectively.

The lens position detector 25 includes an encode plate on which a plurality of code patterns are formed at predetermined spacings in the optical axis direction within the range in which the lens group 21 moves and an encoder brush that moves integrally with the lens group 21 and slides along the encode plate. The lens position detector 25 detects the amount of movement of the lens group 21 when the focus adjustment is completed. The lens position detected by the lens position detector 25 is outputted, for example, in the form of the number of pulses.

The lens controller 26 is formed of, for example, a microcomputer that houses a ROM for storing a control program and other information and a flash memory or any other suitable memory for storing data on state information.

The lens controller 26 has a communication function of communicating with the main controller 62 in the camera body 10 via the connector Ec. The communication function allows not only the focus length of the lens group 21, the position of an exit pupil, the aperture setting, the distance at which the focus is achieved, the amount of peripheral light, and other state information data as well as the information on the position of the focus lens 211 detected by the lens position detector 25 to be sent to the main controller 62 but also data on the amount by which the focus lens 211 should be moved and other information to be received from the main controller 62.

The aperture drive mechanism 27 receives a driving force from an aperture drive actuator 76M via the coupler 75 and changes the diameter of the aperture 23.

The electrical configuration of the camera body 10 will next be described. The camera body 10 includes the imaging device 101, a shutter unit 40, an AFE (Analog Front End) 5, an image processor 61, an image memory 614, the main controller 62, a flashlight circuit 63, an operation unit 64, a VRAM 65, a card interface (I/F) 66, the memory card 67, a communication interface (I/F) 68, a power supply circuit 69, the battery 69B, a mirror drive controller 72A and a mirror drive actuator 72M, a shutter drive controller 73A and a shutter drive actuator 73M, and an aperture drive controller 76A and the aperture drive actuator 76M.

The imaging device 101 is disposed in the optical axis of the lens group 2 contained the interchangeable lens 2 attached to the camera body 10 in such a way that the imaging device 101 is perpendicular to the optical axis. The imaging device 101 is, for example, a CMOS color area sensor (CMOS-type imaging device) in which a plurality of pixels, each of which being a photodiode, are arranged two-dimensionally in a matrix. The imaging device 101 produces analog electric signals (image signals) of R (red), G (green), and B (blue) color components contained in subject light received through the interchangeable lens 2, and outputs the analog electric signals as R, G, and B image signals.

A timing control circuit 51, which will be described later, controls imaging operations performed in the imaging device 101. For example, the timing control circuit 51 starts (and stops) exposure of the imaging device 101 to light, outputs the charge in the pixels contained in the imaging device 101, and reads pixel signals.

The shutter unit 40 is disposed in front of the imaging device 101 in the optical axis direction. The shutter unit 40 is configured as a mechanical focal-plane shutter that includes a vertically moving screen and closes or opens the screen to block or unblock the optical path of the subject light guided to the imaging device 101 along the optical axis of the interchangeable lens 2. The shutter unit 40 can be omitted when the imaging device 101 has a fully electronic shutter capability.

The AFE 5 provides timing pulses that allow the imaging device 101 to carry out a predetermined action, performs predetermined signal processing on the image signals outputted from the imaging device 101 (a group of analog signals corresponding to the light received by the pixels that form the CMOS area sensor), converts the image signals into digital signals, and outputs the digital signals to the image processor 61. The AFE 5 includes the timing control circuit 51, a signal processor 52, and an A/D converter 53.

The timing control circuit 51 controls the imaging operation of the imaging device 101 by producing predetermined timing pulses (vertical scan pulses $\phi$Vn, horizontal scan pulses $\phi$Vm, and pulses used to produce a reset signal $\phi$Vr and other signals) based on a reference clock outputted from the main controller 62 and outputting the timing pulses to the imaging device 101. The timing control circuit 51 also controls the operations of the signal processor 52 and the A/D converter 53 by outputting predetermined timing pulses thereto.

The signal processor 52 performs predetermined analog signal processing on the analog image signals outputted from the imaging device 101. The signal processor 52 includes a CDS (Correlated Double Sampling) circuit, an AGC (Auto-Gain Control) circuit, and a clamp circuit. The A/D converter 53 converts the analog R, G, and B image signals outputted from the signal processor 52 into digital image signals expressed by a plurality of bits (12 bits, for example) based on the corresponding timing pulses outputted from the timing control circuit 51.

The image processor 61 performs predetermined signal processing on the image data outputted from the AFE 5 to create an image file, and includes a black level correction circuit 611, a white balance control circuit 612, and a gamma correction circuit 613. The image data grabbed by the image processor 61 are temporality written in the image memory 614 in synchronization with the reading operation performed in the imaging device 101. The image data written in the image memory 614 are accessed and processed in the blocks in the image processor 61 in the following processes.

The black level correction circuit 611 corrects the black level of each of the R, G, and B digital image signals, which have been converted from the analog signals by the A/D converter 53, to a reference black level.

The white balance control circuit 612 performs level conversion (white balance (WB) adjustment) on the digital signals of the R (red), G (green), and B (blue) color components based on a white reference according to a light source. That is, the white balance control circuit 612 identifies portions in the imaged subject that are estimated to be inherently white based on WB adjustment data provided from the main controller 62 along with the data on the brightness, chroma, and other parameters, determines the average values of the R, G, and B color components, the G/R ratio, and the G/B ratio in each of the identified portions, and performs level correction by using the ratios as correction gains for the R and B components.

The gamma correction circuit 613 corrects the grayscale characteristics of the image data that have undergone the WB adjustment. Specifically, the gamma correction circuit 613 uses a gamma correction table set in advance for each of the color components to perform nonlinear conversion and offset adjustment on the level of the image data.

In an imaging mode, the image memory 614 temporarily stores image data outputted from the image processor 61 and is used as a work area where the main controller 62 performs predetermined processing on the image data. In a playback mode, the image memory 614 temporarily stores image data read from the memory card 67.

The main controller 62 is formed of, for example, a microcomputer that houses a ROM for storing a control program and other information and a RAM or any other suitable storage section for temporarily storing data, and controls the operations of the portions that form the imaging apparatus 1.

The main controller 62 also functions as processing means for detecting where a finger Fp touches the display screen 33*f* of the rear monitor 33 by using a touch panel 332 and performing a process according to the touched position.

The flashlight circuit 63 controls the amount of light emission from the flashlight 318 or an external flashlight connected to the connection terminal 319 to be the amount of light emission set by the main controller 62.

The operation unit 64 includes the mode setting dial 306, the shutter button 307, the cross-shaped key 314, the push button 315, and the main switch 317 described above, and is used to input operational information to the main controller 62.

The rear monitor 33 includes the LCD 331 described above and the transparent touch panel 332 disposed on the LCD 331.

The display state of the LCD 331 can be switched between the displayed (light-up) state and the non-displayed (shut-off) state, for example, by operating the monitor operation button 324 to turn on and off the power supply.

The touch panel 332 functions as a touched position detector that detects the touched position where the user touches the display screen 33*f* of the rear monitor 33, whereby a user's operation can be inputted.

The thus configured rear monitor 33, when the approaching eye sensor 15 detects that an eye of the user has approached, is shut off to prevent glare produced by the display screen 33*f* and reduce electric consumption thereof. In the touch panel 332, however, some touch buttons (icons B1 to B5 in FIGS. 6A and 6B) remains active (turned on) while the other touch buttons (tracking AF frames Bp in FIGS. 6A and 6B) are turned off, as will be described later.

The VRAM 65 is a buffer memory having a capacity of storing image signals corresponding to the number of pixels of the LCD 331 and disposed between the main controller 62 and the LCD 331. The card I/F 66 is an interface that allows signal communication between the memory card 67 and the main controller 62. The memory card 67 is a recording medium that stores image data produced by the main controller 62. The communication I/F 68 is an interface that allows image data and other information to be transferred to a personal computer and other external apparatus.

The power supply circuit 69 is formed of, for example, a constant voltage circuit and produces voltages for driving the entire imaging apparatus 1, including the main controller 62 and other controllers, the imaging device 101, and a variety of other drivers. The control of conducting electricity to the imaging device 101 is carried out based on a control signal provided from the main controller 62 to the power supply circuit 69. The battery 69B is a power supply formed of a nickel-hydrogen rechargeable cell or any other suitable secondary battery or an alkali dry cell or any other suitable primary battery. The battery 69B supplies electric power to the entire imaging apparatus 1.

The mirror drive controller 72A produces a drive signal for driving the mirror drive actuator 72M in synchronization with the imaging operation timing. The mirror drive actuator 72M is an actuator that turns the mirror unit 103 (quick-return mirror) and sets it in a horizontal or inclined attitude.

The shutter drive controller 73A produces a drive control signal to be sent to the shutter drive actuator 73M based on a control signal provided from the main controller 62. The shutter drive actuator 73M is an actuator that opens and closes the shutter unit 40.

The aperture drive controller 76A produces a drive control signal to be sent to the aperture drive actuator 76M based on a control signal provided from the main controller 62. The aperture drive actuator 76M provides the aperture drive mechanism 27 with a driving force via the coupler 75.

[Configuration of Key Portion of Rear Monitor 33]

The imaging apparatus 1 includes the approaching eye sensor 15 provided below the optical finder 316, as described above. When the approaching eye sensor 15 senses that an eye of the user has approached the optical finder 316, the rear monitor 33 is shut off to prevent glare produced by the display screen 33*f* and reduce electric consumption thereof. When the rear monitor 33 is shut off, the LCD 331 transitions to the non-displayed state, whereas the entire touch panel 332 is not disabled but part of the touch panel 332 remains active. The area of the touch panel 332 that remains active will be described below in detail.

Figure 6A:
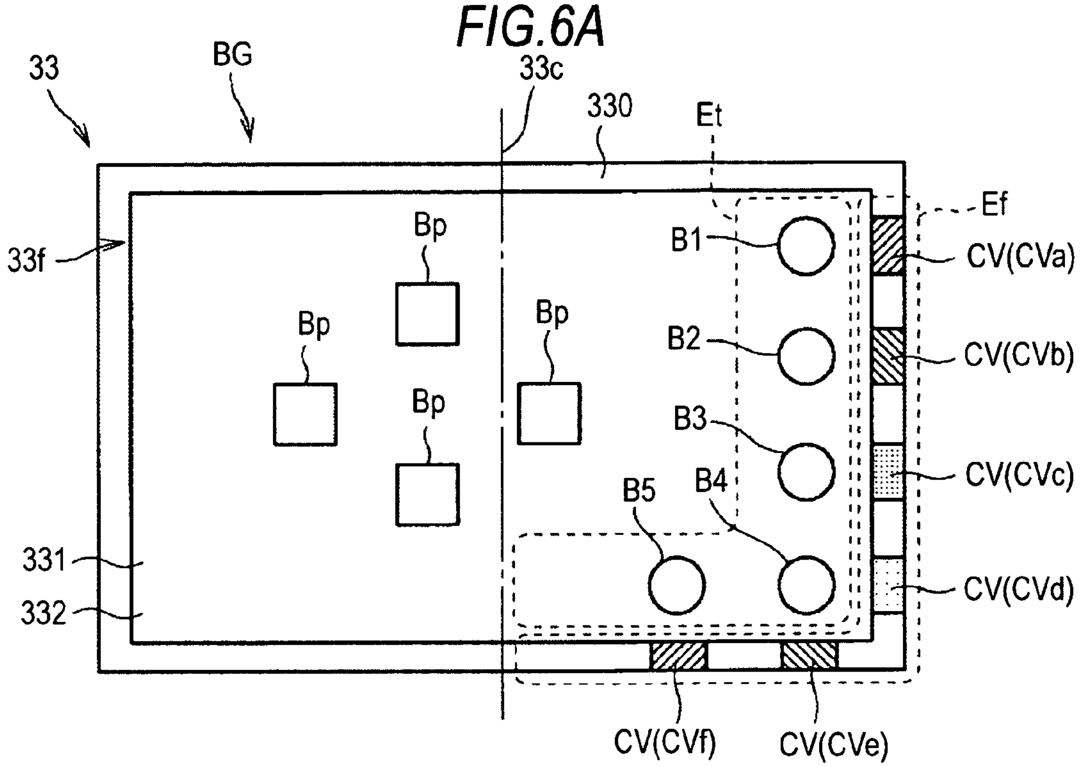
FIGS. 6A and 6B are diagrams for describing the configuration and operation of a rear monitor 33.
Figure 6B:
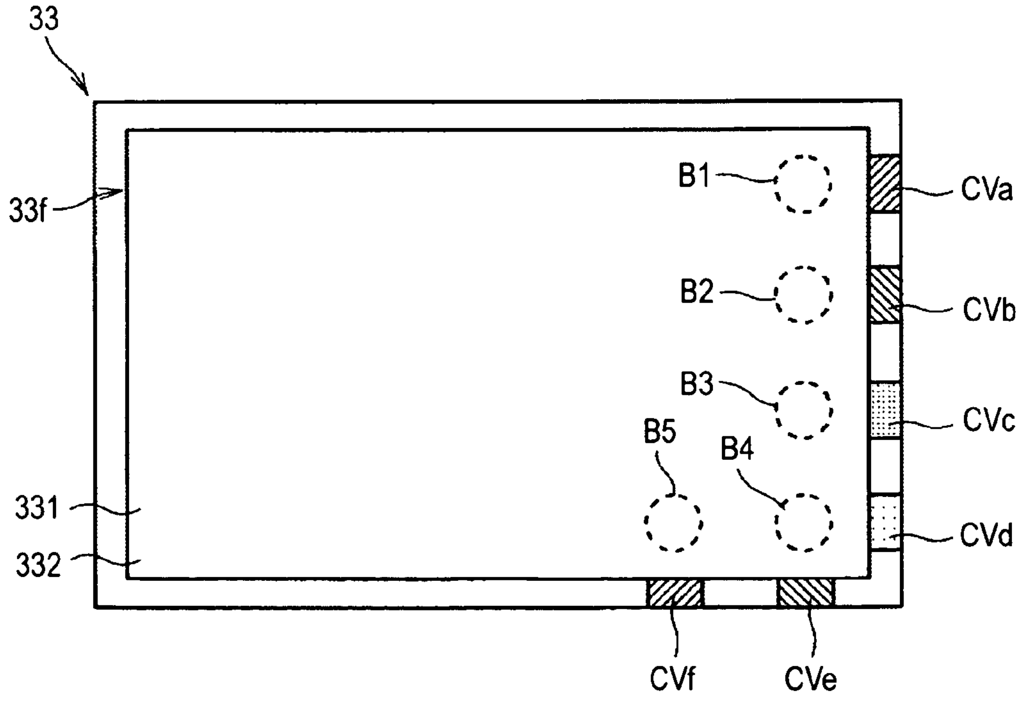

FIGS. 6A and 6B are diagrams for describing the operation of the touch panel 332 in the imaging apparatus 1. FIG. 6A shows a state in which the rear monitor 33 remains lit up because the approaching eye sensor 15 has not sensed that an eye of the user had approached, and FIG. 6B shows a state in which the rear monitor 33 is shut off because the approaching eye sensor 15 has sensed that an eye of the user had approached.

As shown in FIG. 6A, when the approaching eye sensor 15 has not sensed that an eye of the user had approached, the LCD 331 displays a group of buttons BG formed of a plurality of buttons disposed on the touch panel 332. The group of buttons BG includes, for example, four tracking AF frames (buttons) Bp for specifying a focusing-target person (the face of a person) or any other subject to be tracked in live-view images. The group of buttons BG also includes five icons (buttons) B1 to B5 disposed in an area having an L-like shape (also referred to as an "L-shaped area") Et extending from a right portion of the touch panel 332 to a lower portion thereof. That is, in the right half of the display screen 33*f*, i.e., the area on the right side of the center line 33*c* of the display screen 33*f*, the L-shaped area Et is defined as an angled area formed of a right end area (for example, an area disposed at the right end and having a width of approximately one-sixth the width of the display screen 33*f*) and a lower end area (for example, an area disposed at the lower end and having a height of approximately one-third the height of the display screen 33*f*). The icons B1 to B5, which are five circular areas that correspond to different processes when touched, are disposed in the L-shaped area Et.

The five icons B1 to B5 allow the user to access, for example, an ISO sensitivity setting mode, a white balance (WB) setting mode, a drive mode in which continuous shooting, single shooting, and other shooting mode is set, an exposure correction mode, and a mode for setting whether or not the flashlight 318 is activated to emit light.

Figure 7:
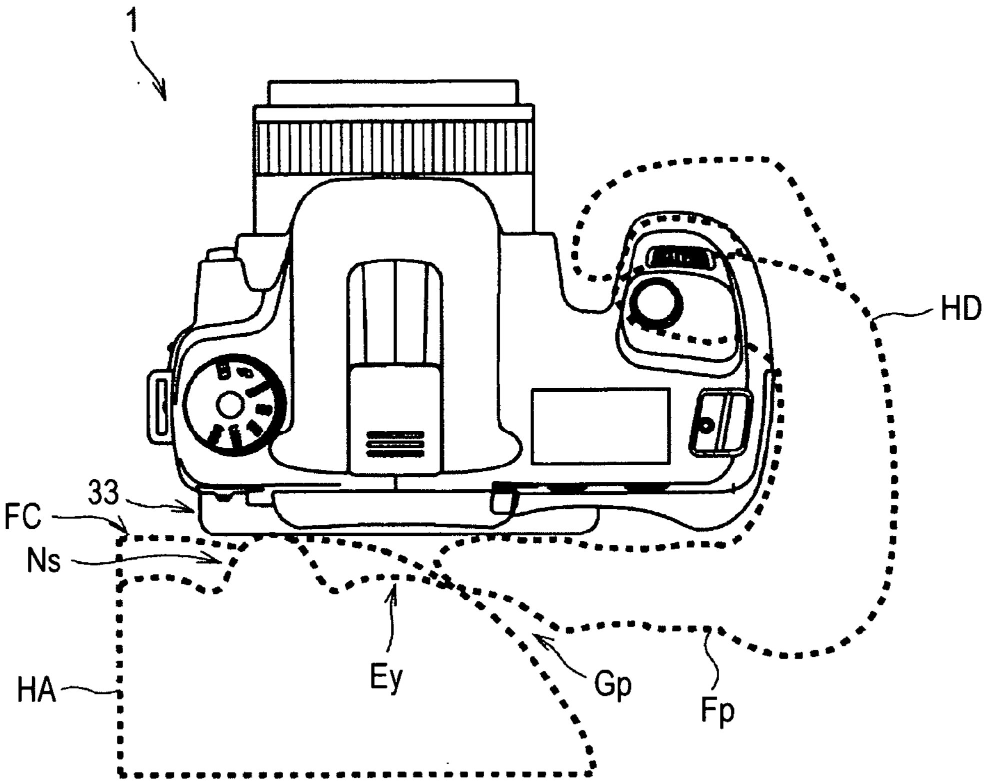
FIG. 7 is a diagram for describing why icons B1 to B5 are disposed in an L-shaped area Et in a touch panel 332.
Figure 8:
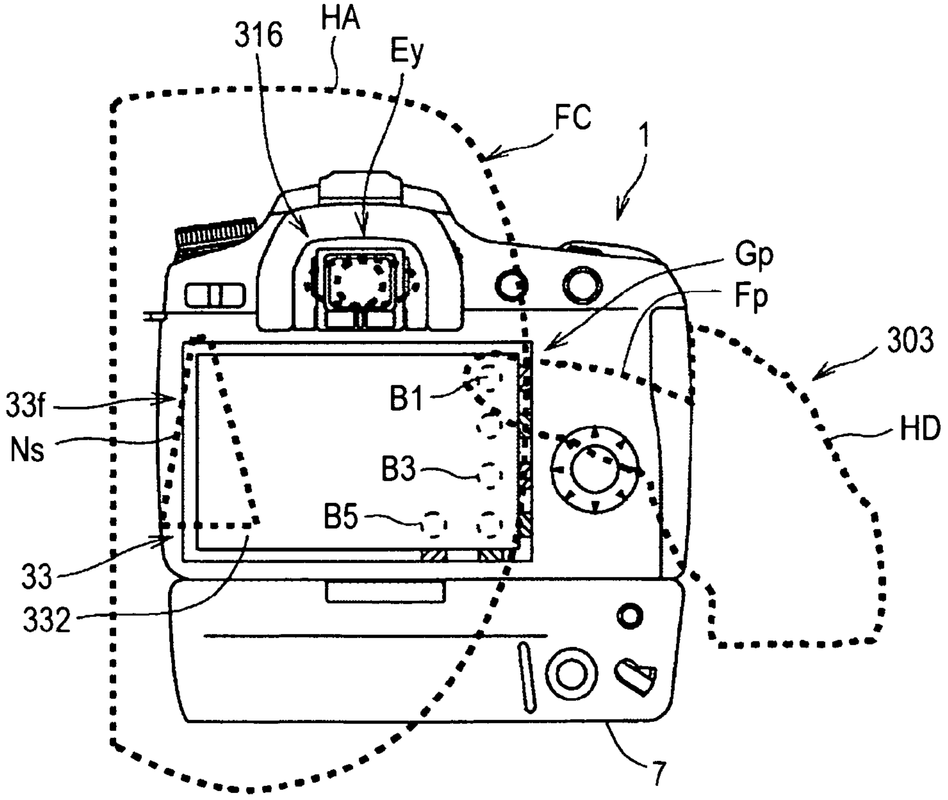
FIG. 8 is another diagram for describing why the icons B1 to B5 are disposed in the L-shaped area Et in the touch panel 332.
Figure 9A:
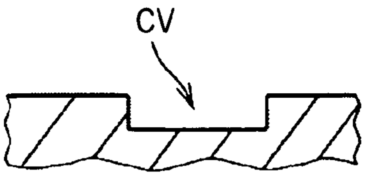
FIGS. 9A to 9F are diagrams for describing the shapes of guiding portions CV.
Figure 9B:
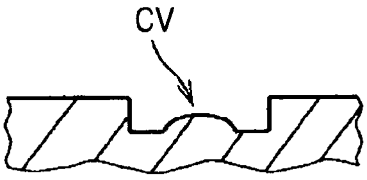
Figure 9C:
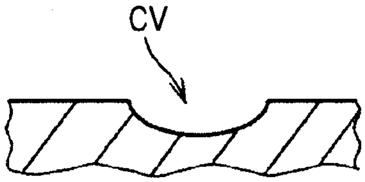
Figure 9D:
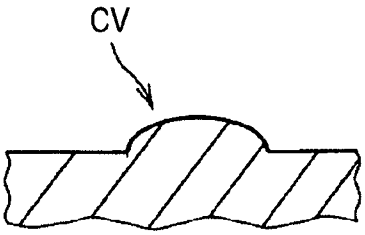
Figure 9E:
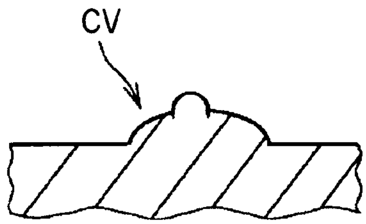
Figure 9F:
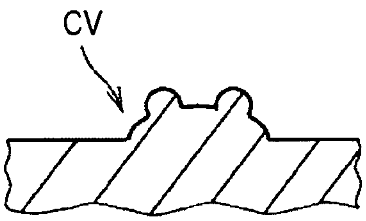

The icons B1 to B5 are disposed in the L-shaped area Et in the touch panel 332 as described above. The reason for this follows:

FIGS. 7 and 8 are diagrams for describing the reason why the icons B1 to B5 are disposed in the L-shaped area Et in the touch panel 332. FIGS. 7 and 8 is a top view and a rear view of the imaging apparatus 1 when the user grips it in the horizontal attitude (standard attitude) and the right eye Ey has approached the optical finder 316. The broken lines represent the head HA and the right hand HD of the user.

As shown in FIG. 7, when the right eye Ey approaches the optical finder 316, the nose Ns approaches the rear monitor 33 and possibly comes into contact with the touch panel 332. On the other hand, a gap Gp is formed between the cheek of the face FC and the rear monitor 33, and the thumb Fp can be slipped into the gap Gp.

Therefore, when the approaching eye sensor 15 senses that an eye of the user has approached the optical finder 316, the imaging apparatus 1 transitions to a state in which the tracking AF frames Bp (FIGS. 6A and 6B) disposed in the area where the nose Ns could touches the touch panel 332 (the area other than the L-shaped area Et described above) are not allowed to respond to any touching operation. On the other hand, the imaging apparatus 1 remains in a state in which the icons B1 to B5 in the L-shaped area Et (FIGS. 6A and 6B), which is the area in the touch panel 332 that the tip of the thumb Fp can reach through the gap Gp between the face FC and the rear monitor 33 and where the face FC does not prevent a touching operation using the thumb Fp, are allowed to respond to a touching operation. That is, when an eye of the user has approached the optical finder 316, the display screen 33*f* of the rear monitor 33 transitions to the non-displayed state, but the imaging apparatus 1 carries out a process corresponding to a touching operation detected only in the L-shaped area Et in the touch panel 332, which corresponds to the area of the display screen 33*f* where the face FC does not prevent a touching operation using the thumb Fp.

When the user looks into the optical finder 316 and the approaching eye sensor 15 senses that an eye of the user approaches the optical finder 316, the rear monitor 33 is shut off because the user will not be able to visually recognize the rear monitor 33 directly. Therefore, the icons B1 to B5, which remains operable, are not displayed as shown in FIG. 6B, and the user needs to operate any of the icons B1 to B5 blindly when the user wants to touch it. In this case, the user possibly touches an unintended icon among the icons B1 to B5. To address the problem, in the imaging apparatus 1 of the present embodiment, guiding portions CV are provided along the frame 330 to allow the user to blindly touch any of the icons B1 to B5. Even when the display screen 33*f* has been shut off, the guiding portions CV allow the user to know the positions of the icons B1 to B5 by touching the guiding potions CV with the portion of the thumb Fp away from but close to the fingertip.

That is, an L-shaped area Ef is defined along the frame 330 in the vicinity of the L-shaped area Et in the touch panel 332, and six guiding portions CV (CVa to CVf), each of which has a concave and/or convex shape, are formed in the L-shaped area Ef at locations close to the icons B1 to B5. In other words, the guiding portions CV for guiding a finger of the user to the icons B1 to B5 are provided along the frame 330 around the touch panel 332 but in the vicinity of the icons B1 to B5. For example, the guiding portions CVa to CVf having concave/convex shapes different from one another are provided along the frame 330, as shown in FIGS. 9A to 9F, which are vertical cross-sectional views of the guiding portions CV. In this way, the user can discriminate any of the guiding portions CVa to CVf from the others with the thumb Fp of the right hand HD, whereby the user can blindly touch any intended one of the icons B1 to B5 without difficulty.

Figure 10:
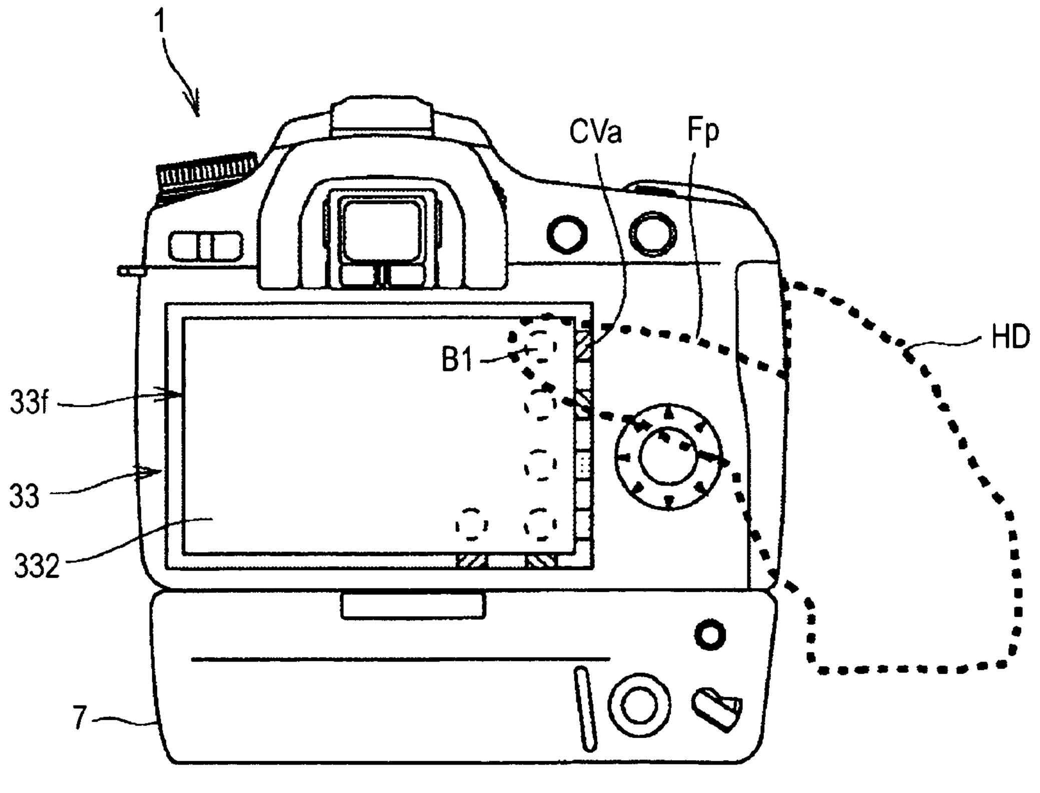
FIG. 10 shows how the icon B1 is operated in the imaging apparatus 1 held in a horizontal attitude.
Figure 11:
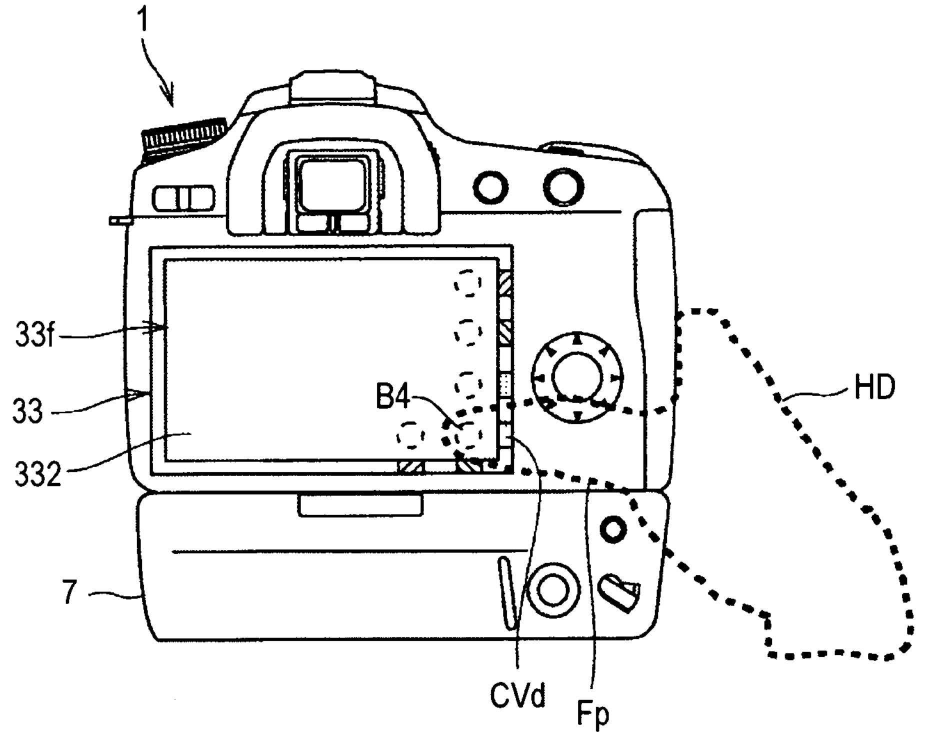
FIG. 11 shows how the icon B4 is operated in the imaging apparatus 1 held in the horizontal attitude.
Figure 12:
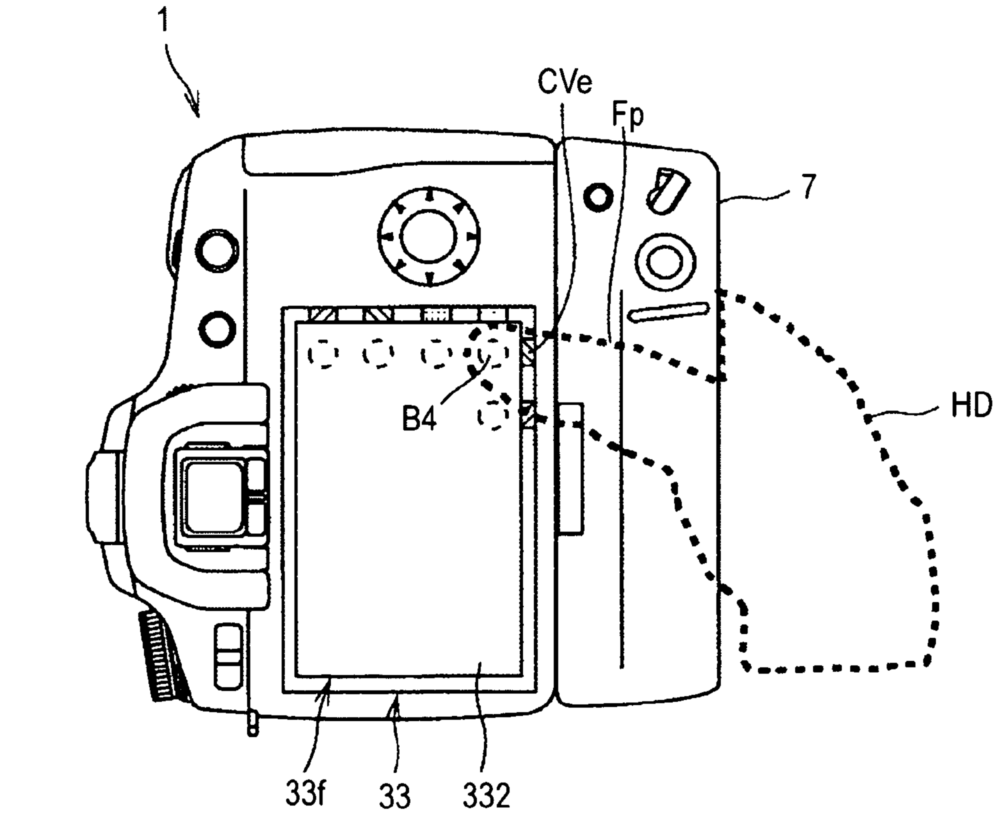
FIG. 12 shows how the icon B4 is operated in the imaging apparatus 1 held in a vertical position.

Therefore, in the imaging apparatus 1 gripped with the right hand HD and held in the horizontal attitude as shown in FIGS. 10 and 11, even when the approaching eye sensor 15 senses that an eye of the user has approached and the rear monitor 33 is shut off, the guiding portions CV allow the user to discriminate, for example, the guiding portions CVa and CVd from each other with the thumb Fp and touch the icon B1 or B4 correctly. Similarly, for example, in the imaging apparatus 1 with the vertical position control grip 7 attached thereto and held in the vertical attitude as shown in FIG. 12, even when the rear monitor 33 is shut off, the user can discriminate the guiding portion CVe from the others with the thumb Fp of the right hand HD, which grips the vertical position control grip 7, whereby the user can operate the icon B4 correctly. In the imaging apparatus 1 held in the vertical attitude as well, the L-shaped area Et in the touch panel 332 is configured as the area of the display screen 33*f* where the face FC does not prevent the user from carrying out a touching operation using the thumb Fp even when an eye of the user has approached the optical finder 316.

Figure 13:
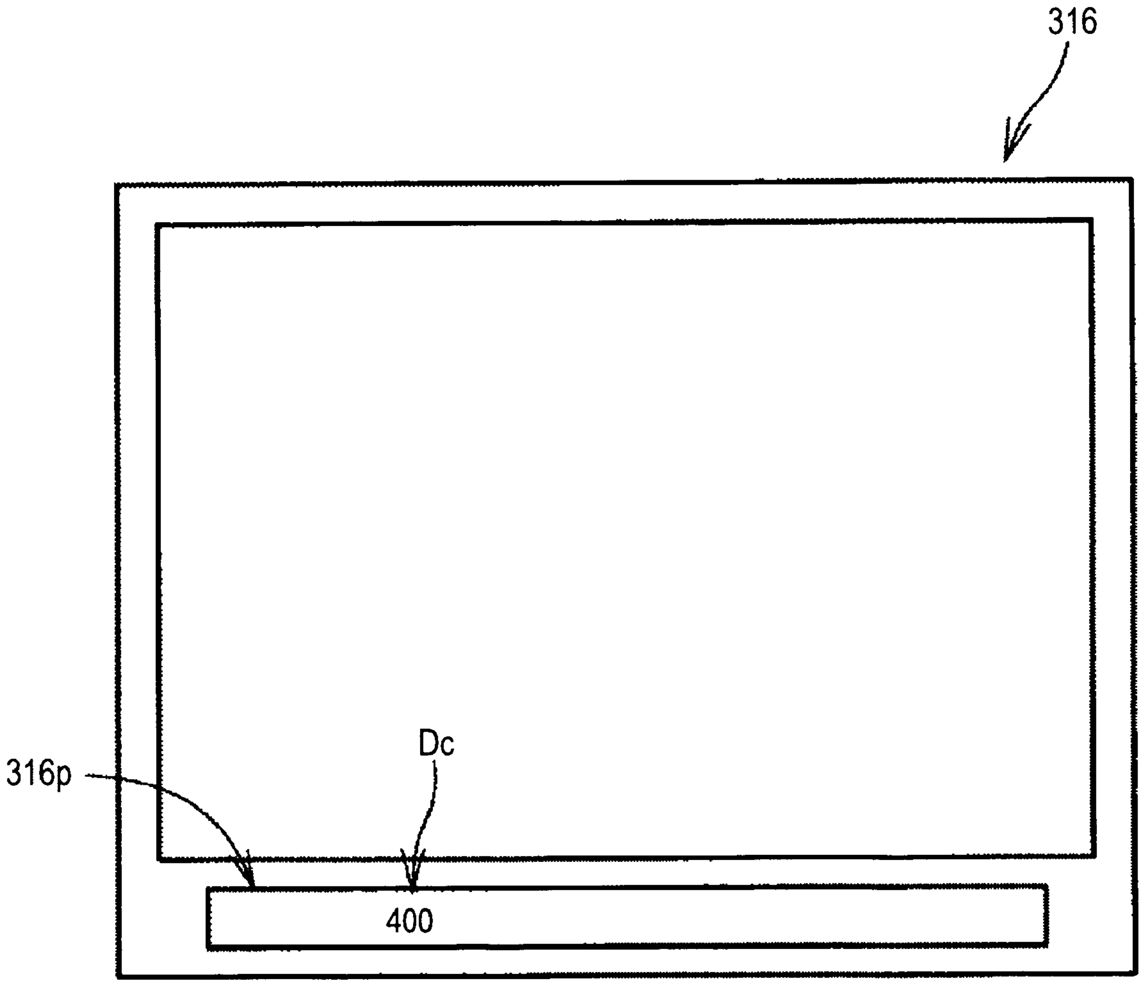
FIG. 13 is a diagram for describing a display operation of the optical finder 316 to be carried out in response to an operation of touching any of the icons B1 to B5.

When the approaching eye sensor 15 senses an approaching eye of the user and the user operates, for example, the icon B1, to which the ISO sensitivity setting mode is assigned, the currently set ISO sensitivity set value "400", for example, the ISO sensitivity indication Dc shown in FIG. 13, is displayed in the information display section 316*p* in the optical finder 316. To change the ISO sensitivity set value, the user operates any of the operation dials 92, 73 and the cross-shaped key 314. In this process, when the user moves the fingertip, for example, from the icon B1 to the icon B2, the information display section 316*p* changes the displayed setting to the one corresponding to the item assigned to the icon B2 (WB setting mode).

Further, in the imaging apparatus 1 of the present embodiment, the user can operate the monitor operation button 324 to shut off the rear monitor 33. In this case as well, the icons B1 to B5 in the L-shaped area Et in the touch panel 332 remain operable. That is, even when the display screen 33*f* of the rear monitor 33 is in the non-displayed state, the imaging apparatus 1 carries out the process according to the touched position detected in the L-shaped area Et in the touch panel 332, i.e., the process according to the touched one of the icons B1 to B5. In this case as well, the user can touch a desired one of the icons B1 to B5 with the aid of the guiding portions CV disposed along the frame 330 as described above, and the current set value of the item assigned to the touched icon and other information are displayed in the upper-side display panel 91. That is, when the display screen 33*f* is in the non-displayed state, the upper-side display panel 91 displays information associated with the process according to the touched position detected in the L-shaped area Et in the touch panel 332. Therefore, in a night view shooting, on-stage performance shooting, or any other similar shooting situation, in which the user captures images without looking into the optical finder 316 and with the rear monitor 33 shut off, the user can smoothly operate any of the icons B1 to B5 with the aid of the guiding portions CV and confirm the current operation in the upper-side display panel 91.

According to the configuration and operation of the imaging apparatus 1 described above, the icons B1 to B5 set in the touch panel 332 are disposed in the L-shaped area Et (FIGS. 6A and 6B), and any of the icons B1 to B5 can be touched with the finger Fp slipped into the gap Gp created between the face FC and the touch panel 332 when an eye of the user has approached the optical finder 316, whereby the touch panel 332 is effectively used even when the eye has approached.

The ocular finder of the imaging apparatus 1 is not necessarily the optical finder 316 with the information display section 316*p* provided in a lower portion thereof (FIG. 4). Alternatively, an optical finder 316A shown in FIGS. 14A and 14B or an electronic view finder 316B shown in FIGS. 15A and 15B may be employed. A description will be made of a display operation of the alternative finders described above to be carried out in response to an operation of touching any of the icons B1 to B5.

Figure 14A:
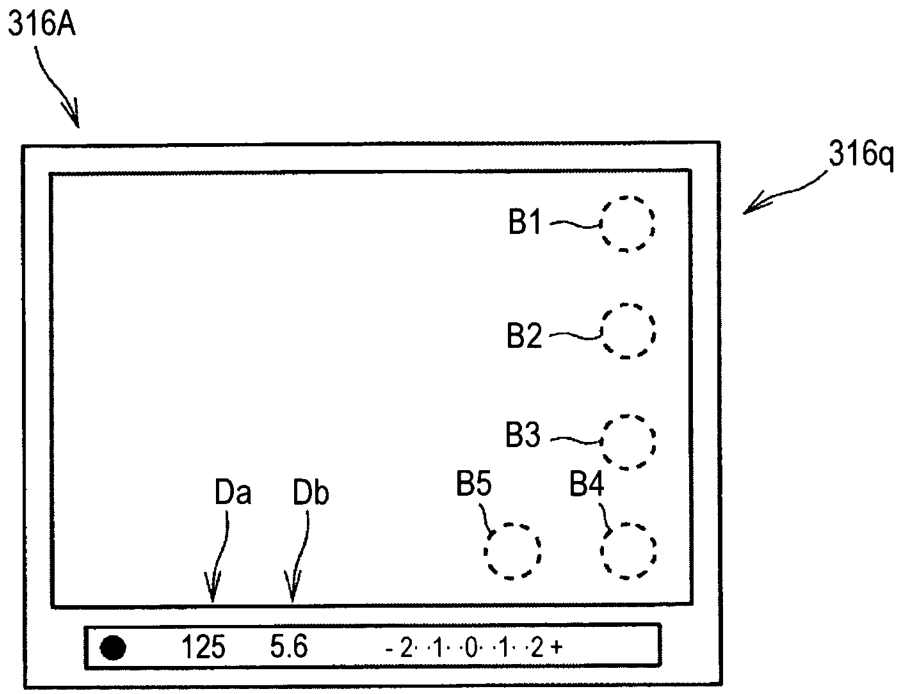
FIGS. 14A and 14B are diagrams for describing a display operation of an optical finder 316A including a liquid crystal display panel to be carried out in response to an operation of touching any of the icons B1 to B5.
Figure 14B:
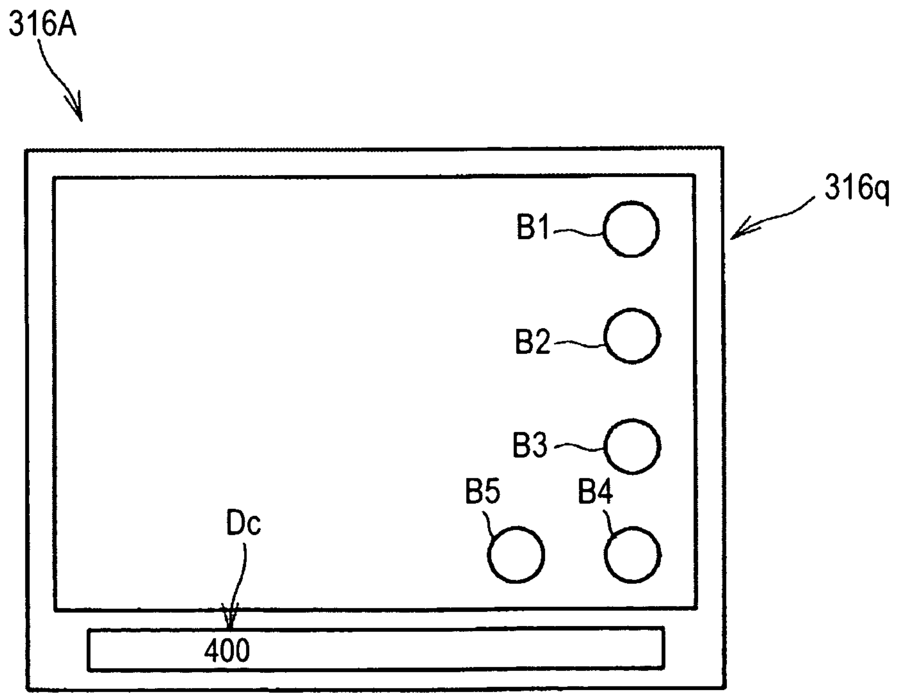

FIGS. 14A and 14B are diagrams for describing the display operation of the optical finder 316A to be carried out in response to an operation of touching any of the icons B1 to B5.

The optical finder 316A includes an information display section 316*q* capable of displaying information across its surface including an area where a subject image produced by a liquid crystal display panel (not shown) provided in a finder optical system is displayed. It is noted that the liquid crystal display panel in the optical finder 316A does not have an image display capability of the electronic view finder 316B, which will be described later.

In the optical view finder 316A, when the approaching eye sensor 15 senses that an eye of the user has approached the optical view finder 316A and the user touches any of the icons B1 to B5 on the touch panel 332, the information displayed in the information display section 316*q* of the optical finder 316A is switched, as in the optical finder 316 described above. For example, when the user touches the icon B1, to which the ISO sensitivity setting mode is assigned, the information display section 316*q* switches the information displayed thereon from the shutter speed indication Da and the aperture setting indication Db (FIG. 14A), which had been displayed until the approaching eye was sensed, to the ISO sensitivity indication Dc shown in FIG. 14B. Further, the optical finder 316A displays the icons B1 to B5 (FIG. 14A), which had not been displayed in the information display section 316*q* until the approaching eye was sensed, in response to the sensing of the approaching eye, as shown in FIG. 14B. This action can notify the user that the icons B1 to B5 on the touch panel 332 remain operable even in the presence of an approaching eye. In the information display section 316*q*, however, all the five icons B1 to B5 are not necessarily displayed in response to the sensing of the approaching eye. Instead, only one icon that has been operated by the user may be displayed.

Figure 15A:
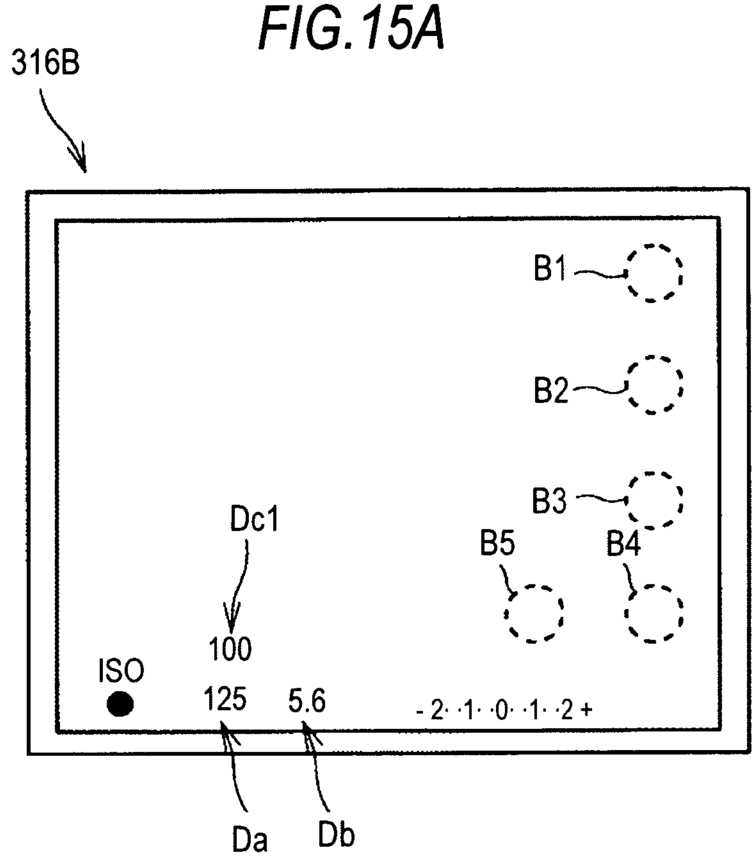
FIGS. 15A and 15B are diagrams for describing a display operation of an electronic view finder 316B to be carried out in response to an operation of touching any of the icons B1 to B5.
Figure 15B:
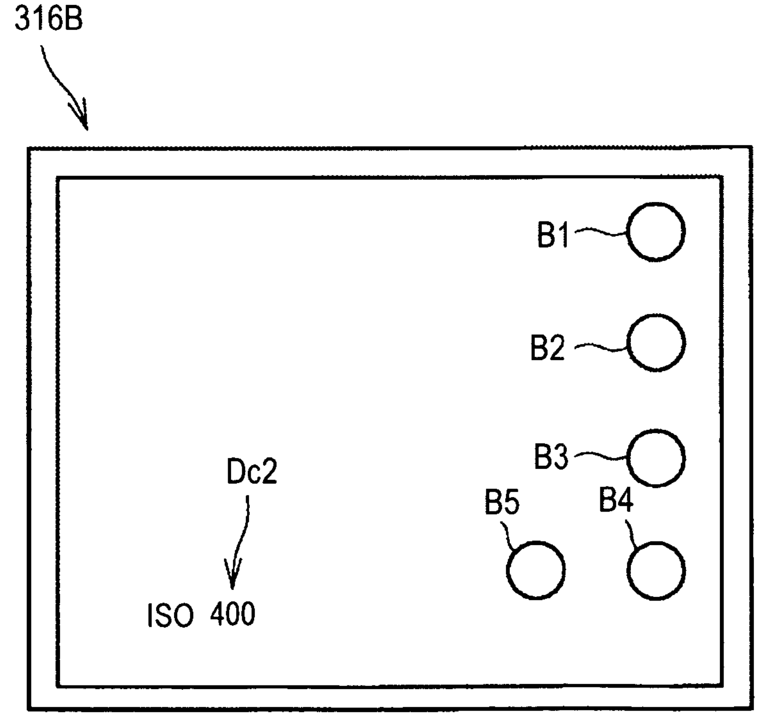

FIGS. 15A and 15B are diagrams for describing the display operation of the electronic view finder 316B to be carried out in response to an operation of touching any of the icons B1 to B5.

The electronic view finder 316B allows the user to visually recognize a subject image, for example, acquired by the imaging device 101 by displaying the subject image on a liquid crystal display panel.

In the electronic view finder 316B, when the approaching eye sensor 15 senses that an eye of the user has approached the electronic view finder 316B and the user touches any of the icons B1 to B5 on the touch panel 332, the information displayed on the electronic view finder 316B is switched, as in the optical finder 316A described above. For example, when the user touches the icon B1, to which the ISO sensitivity setting mode is assigned, the electronic view finder 316B switches the information displayed thereon from the shutter speed indication Da, the aperture setting indication Db, and the ISO sensitivity (the currently set value "100") indication Dc1 (FIG. 15A), which had been displayed until the approaching eye was sensed, to only the ISO sensitivity ("400" after the setting is changed) indication Dc2 shown in FIG. 14B. Further, the color used to display the indication Dc2 may differ from that of the ISO sensitivity indication Dc1 displayed until the approaching eye was sensed. As in the optical finder 316A described above, the electronic view finder 316B displays the icons B1 to B5 (FIG. 15A), which had not been displayed until the approaching eye was sensed, in response to the sensing of the approaching eye, as shown in FIG. 15B.

In the optical finder 316A and the electronic view finder 316B described above, as in the optical finder 316 described above, the user can confirm the operation corresponding to any of the icons B1 to B5 that the user has touched.

Figure 16:
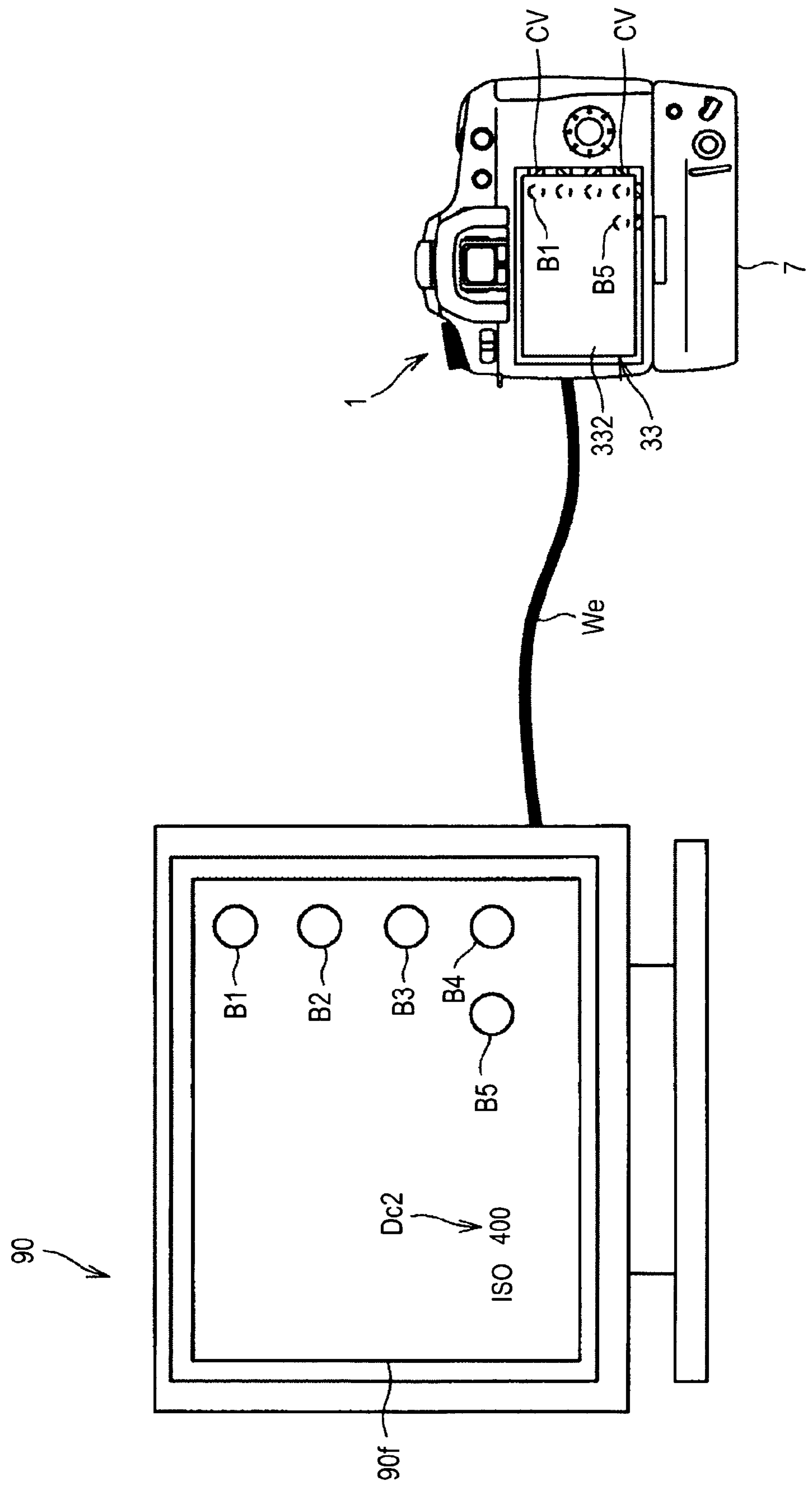
FIG. 16 is a diagram for describing a display operation of an external monitor 90 to be carried out in response to an operation of touching any of the icons B1 to B5 in the imaging apparatus 1.

When the imaging apparatus 1 is connected to an external monitor 90 via a cable We, such as a video cable and an HDMI cable, so that the imaging apparatus 1 can communicate with the external monitor 90 and an image captured by the imaging apparatus 1 can be reproduced on the external monitor 90 as shown in FIG. 16, the user can again operate any of the icons B1 to B5 correctly with the aid of the guiding potions CV. Specifically, when the external monitor 90 is connected to the imaging apparatus 1, the rear monitor 33 is shut off to reduce electric consumption, but the icons B1 to B5 on the touch panel 332 are displayed on a display screen 90*f* of the external monitor 90, as shown in FIG. 16. The external monitor 90 displays, for example, the ISO sensitivity indication Dc2, which allows the user to confirm the operation blindly performed on one of the icons B1 to B5. The user can thus smoothly operate any of the icons B1 to B5.

<Variations>

The shapes of the guiding portions in the embodiment described above do not necessarily differ from one another for discrimination purposes as shown in FIGS. 9A to 9F. Instead, the state of the surfaces of the guiding portions, such as the degree of roughness, may differ from one another for discrimination purposes.

The upper-side display panel 91 in the imaging apparatus in the embodiment described above is not necessarily provided but may be omitted. Consider a case where the monitor operation button 324 is operated to shut off the rear monitor 33 and then the touch panel 332 detects that any of the icons B1 to B5 is touched by the user. In this case, the rear monitor 33 is configured, for example, in such a way that it lights up and displays the setting associated with the operated icon. That is, when the display screen 33*f* of the rear monitor 33 is in the non-displayed state, the display screen 33*f* is switched to the displayed state in response to the detection of a touched position in the L-shaped area Et in the touch panel 332, i.e., the detection of any of the icons B1 to B5. In this way, even when no upper-side display panel is provided, the user can confirm an operation performed on any of the icons B1 to B5.

In the embodiment described above, the imaging apparatus is not necessarily a digital camera. Instead, the imaging apparatus may be a silver halide camera (film camera).

In the embodiment described above, the touch panel is not necessarily used to detect a touched position. For example, a touched position may be optically detected, for example, by scanning infrared light or any other suitable light over the display screen in a matrix form and sensing the location where the light scanned over the display screen is interrupted.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an ocular-type finder;
a display section provided below the finder and having a display screen capable of displaying an image;
processing means for detecting where a finger touches the display screen and carrying out a process according to the touched position; and
a grip serving for gripping purposes provided to the right of the display section,
wherein an angled area formed of a right end area and a lower end area is defined in the right half of the display screen, and
the processing means includes limited processing means for carrying out a process associated with a touching operation detected only in the angled area when an eye has approached the finder,
wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

2. The imaging apparatus according to claim 1,
wherein a plurality of areas for which different operations are assigned to the process are defined in the angled area, and
guiding portions are provided around the display screen in the vicinity of the plurality of areas, the guiding portions guiding the finger to the plurality of areas.

3. The imaging apparatus according to claim 2,
wherein each of the guiding portions has a concave and/or convex shape.

4. The imaging apparatus according to claim 1 or 2, wherein
a process according to a touched position detected in the angled area is carried out even when the display screen is in the non-displayed state.

5. The imaging apparatus according to claim 1,
wherein the angled area is the area of the display screen where the face does not prevent a touching operation performed by the finger when the imaging apparatus is held in a vertical attitude and an eye has approached the finder.

6. The imaging apparatus according to claim 1, wherein when the display screen is in the non-displayed state, the display screen is switched to the displayed state in response to the detection of a touched position in the angled area.

7. The imaging apparatus according to claim 1, further comprising another display section different from the display section, wherein when the display screen is in the non-displayed state, the other display section displays information associated with a process according to a touched position detected in the angled area.

8. An imaging apparatus comprising:

an ocular-type finder;

a display section provided below the finder and having a display screen capable of displaying an image; and processing means for detecting where a finger touches the display screen and carrying out a process according to the touched position, wherein the processing means includes limited processing means for carrying out a process associated with a touching operation detected only in the area of the display screen where the face does not prevent a touching operation performed by the finger when an eye has approached the finder, wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

9. An imaging apparatus comprising:

an ocular-type finder;

a display section provided below the finder and having a display screen capable of displaying an image;

processing means for detecting where a finger touches the display screen and carrying out a process according to the touched position; and a grip serving for gripping purposes provided to the right of the display section, wherein a right end area is defined in the right half of the display screen, and the processing means includes limited processing means for carrying out a process associated with a touching operation detected only in the right end area when an eye has approached the finder, wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

10. An imaging apparatus comprising:

an ocular-type finder;

a display section provided below the finder and having a display screen capable of displaying an image;

processing means for detecting where a finger touches the display screen and carrying out a process according to the touched position; and a grip serving for gripping purposes provided to the right of the display section, wherein a lower end area is defined in the right half of the display screen, and the processing means includes limited processing means for carrying out a process associated with a touching operation detected only in the lower end area when an eye has approached the finder, wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

11. An imaging apparatus comprising:

an ocular-type finder;

a display section provided below the finder and having a display screen capable of displaying an image;

a processing unit configured to detect where a finger touches the display screen and carry out a process according to the touched position; and a grip serving for gripping purposes provided to the right of the display section, wherein an angled area formed of a right end area and a lower end area is defined in the right half of the display screen, and the processing unit includes a limited processing unit configured to carry out a process associated with a touching operation detected only in the angled area when an eye has approached the finder, wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

12. An imaging apparatus comprising:

an ocular-type finder;

a display section provided below the finder and having a display screen capable of displaying an image; and a processing unit configured to detect where a finger touches the display screen and carry out a process according to the touched position, wherein the processing unit includes a limited processing unit configured to carry out a process associated with a touching operation detected only in the area of the display screen where the face does not prevent a touching operation performed by the finger when an eye has approached the finder, wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

13. An imaging apparatus comprising:

an ocular-type finder;

a display section provided below the finder and having a display screen capable of displaying an image;

a processing unit configured to detect where a finger touches the display screen and carry out a process according to the touched position; and a grip serving for gripping purposes provided to the right of the display section, wherein a right end area is defined in the right half of the display screen, and the processing unit includes a limited processing unit configured to carry out a process associated with a touching operation detected only in the right end area when an eye has approached the finder, wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

14. An imaging apparatus comprising:

an ocular-type finder;

a display section provided below the finder and having a display screen capable of displaying an image;

a processing unit configured to detect where a finger touches the display screen and carry out a process according to the touched position; and a grip serving for gripping purposes provided to the right of the display section, wherein a lower end area is defined in the right half of the display screen, and the processing unit includes a limited processing unit configured to carry out a process associated with a touching operation detected only in the lower end area when an eye has approached the finder, wherein the display screen can be switched between a displayed state and a non-displayed state, when the display screen is in the displayed state and an eye has approached the finder the display screen is automatically switched to the non-displayed state, and when the touching is detected after the display screen is automatically switched to the non-displayed state an indication associated with the detected touching is automatically displayed in the ocular-type finder.

* * * * *